No. 629,539. Patented July 25, 1899.
J. BERTRAM.
BORING AND EXCAVATING IMPLEMENT.
(Application filed July 11, 1898.)
(No Model.)
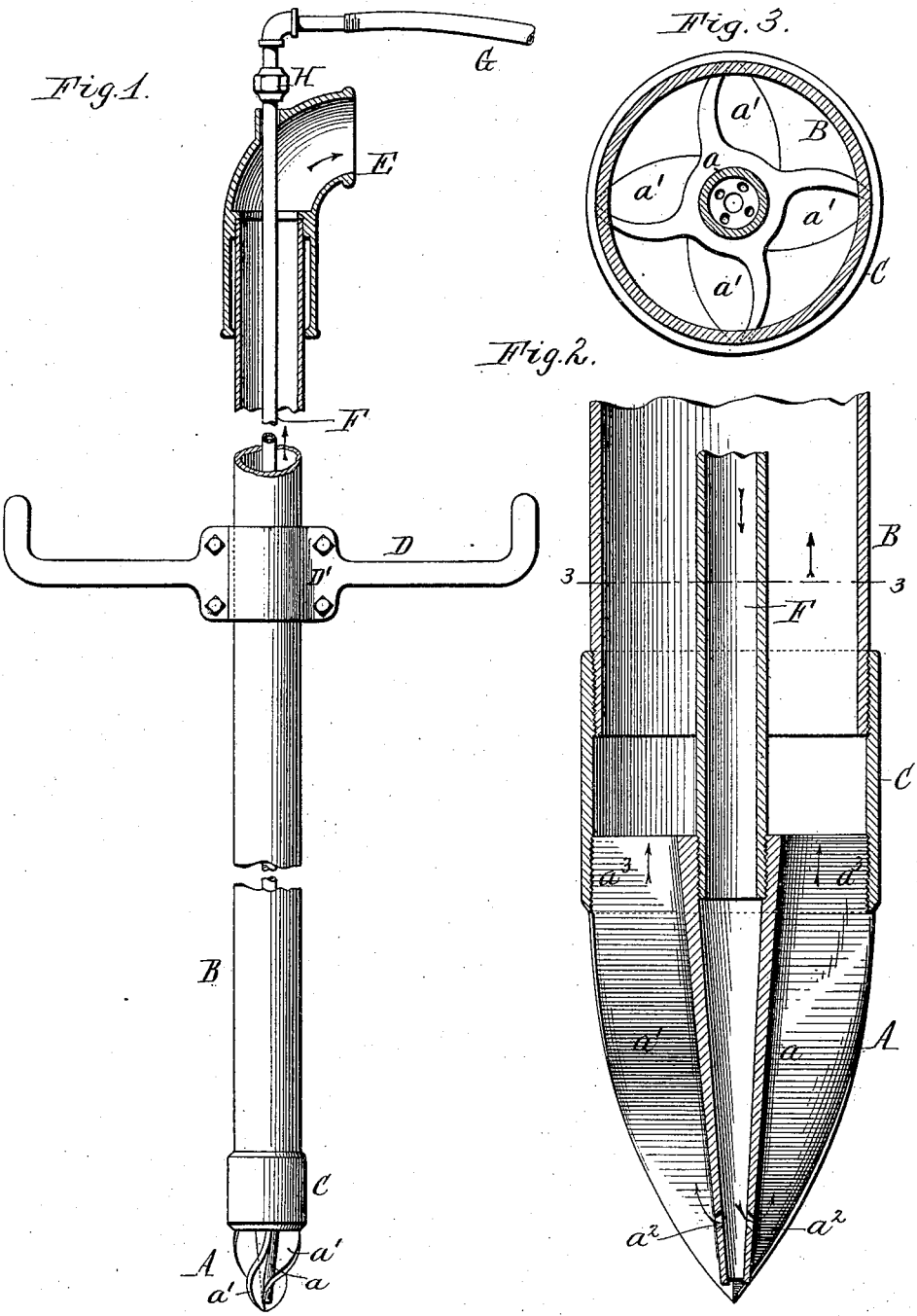

UNITED STATES PATENT OFFICE.

JOHN BERTRAM, OF DUNDAS, CANADA, ASSIGNOR OF TWO-THIRDS TO ALEXANDER H. BERTRAM, OF SAME PLACE, SAMUEL C. ROGERS, OF BUFFALO, NEW YORK, AND JAMES A. STIRLING, OF HAMILTON, CANADA.

BORING AND EXCAVATING IMPLEMENT.

SPECIFICATION forming part of Letters Patent No. 629,539, dated July 25, 1899.

Application filed July 11, 1898. Serial No. 685,609. (No model.)

*To all whom it may concern:*

Be it known that I, JOHN BERTRAM, a subject of the Queen of Great Britain, residing at Dundas, in the Province of Ontario, Dominion of Canada, have invented new and useful Improvements in Boring and Excavating Implements, (for which I obtained a patent for the Dominion of Canada, No. 59,626, dated April 13, 1898,) of which the following is a specification.

This invention relates to a boring tool or implement designed more especially for the use of miners, prospectors, and others for making test-holes in frozen ground.

My invention has for its object to provide a tool of this kind which will thaw the earth and at the same time elevate or eject the thawed and loosened earth to the surface of the ground, thus enabling such holes or excavations to be expeditiously made.

In the accompanying drawings, Figure 1 is a side elevation, partly in section, of my improved boring and excavating implement. Fig. 2 is a longitudinal section, on an enlarged scale, of the auger and the lower portion of its hollow shank. Fig. 3 is a cross-section in line 3 3, Fig. 2.

Like letters of reference refer to like parts in the several figures.

A is the bit or auger of the implement, and B is a rotary tube or hollow shank, to the lower end of which the auger is secured, so as to turn with the shank, the latter being of greater length than the depth to which the ground is to be bored, so that its upper end projects above the surface of the ground. The auger consists of a longitudinal center tube or hollow core $a$ and spiral cutting flanges or blades $a'$, which taper toward the point of the auger. The center tube of the auger forms a conduit for a suitable heating fluid, such as steam, and is provided near its lower end with a number of discharge-apertures $a^2$, through which the steam issues against the surrounding earth for thawing the same. The lower end of the center tube is also open for the same purpose. The auger-flanges are preferably cast in one piece with the center tube $a$, and their upper portions, which are substantially parallel with the axis of the hollow shank B, are rigidly connected with the shank by a collar or coupling C. This coupling is provided in its upper end with an internal screw-thread, which engages with an external thread formed at the lower end of the tubular shank B and in its lower end with a similar screw-thread, which engages with external screw-threads formed on the upper portions of the auger-flanges, as shown at $a^3$ in Fig. 2. The spaces between the upper portions of the auger-flanges open into the coupling C, as shown in Figs. 2 and 3, so that the thawed and loosened earth is free to ascend between the flanges into and through the tubular shank B under the pressure of the steam. The tubular shank B is provided with a handle D for turning it by hand, or, if desired, it may be rotated by power by any suitable mechanism. When the handle D is employed, the same is preferably made vertically adjustable on the shank by a suitable clamp D', to permit the handle to be adjusted to the proper height for boring.

E is an elbow applied to the upper end of the tubular shank for discharging the elevated earth in a lateral direction.

F is a supply-pipe for the steam or other fluid, which is arranged in the hollow shank and is connected to the upper end of the central tube $a$ of the auger. This pipe extends upwardly through the elbow E, and its projecting upper end is connected by a hose or pipe G with a steam-boiler or other source of supply. The steam-supply pipe is provided at or near its junction with the hose G with a union or universal coupling H, which permits the main portion of the supply-pipe to turn with the auger-shank B and the auger, independently of the hose G, which latter is stationary.

In the use of my improved implement steam is admitted to the central supply-pipe F, and the auger is turned in the ordinary manner, so as to penetrate the earth. The steam issuing from the discharge-apertures of the auger-tube $a$ comes in contact with the surrounding earth and thaws the same, and the spiral flanges of the auger loosen the thawed earth and carry the same above the steam-outlets $a^2$. As the steam has no other means of escape except upwardly through the tubular auger-shank, its pressure forces the loose earth upwardly between the flanges of the auger into and through the hollow shank B, whence it is ejected through the elbow E and deposited upon the surface of the ground. The spiral form of the auger-blades causes the ascending earth to assume a cyclonic or whirling motion under the upward pressure of the steam, and this action of the material prevents the large outer tube or shank from becoming clogged.

During the boring operation the upper portion of the tubular shank B may be supported and steadied by a suitable framework or trestle erected over the place to be excavated.

By fitting the upper portion of the auger and the lower end of the hollow shank within the coupling-collar C the latter projects beyond the surface of the shank and the edge of the auger-blades, thus forming an obstruction which prevents the escape of steam between the shank and the wall of the bored hole. By this construction the coupling also produces a hole of larger diameter than the auger-shank B, thus reducing the friction of the descending implement and enabling the same to be operated more easily.

My improved tool is very simple in construction and greatly expedites the boring of test-holes, especially in regions where the ground is frozen to a considerable depth. It is obvious, however, that the tool is equally useful for boring in unfrozen ground, as the steam excavating feature of the tool enables an excavation to be made much more rapidly than with an ordinary auger.

I claim as my invention—

1. A boring and excavating implement, comprising a tube or hollow shank provided with means for turning it, a bit or auger secured to the lower end of said tube and composed of a central tube provided at or near its lower end with one or more steam-escape openings and spiral blades or flanges arranged around said central tube and tapering downwardly to form the point of the auger, the spaces between the upper portions of said blades opening into said hollow shank, and a steam-supply pipe extending through said hollow shank and connected at its lower end with the central tube of the auger, substantially as set forth.

2. A boring and excavating implement, comprising a tube or hollow shank provided with means for turning it, a bit or auger secured to the lower end of said tube and composed of a central tube provided at or near its lower end with one or more steam-escape openings and spiral blades or flanges arranged around said central tube and tapering downwardly to form the point of the auger, and a steam-supply pipe extending through said hollow shank and connected at its lower end with the central tube of the auger and provided outside of said hollow shank with a union or coupling for connecting the same with a stationary supply-pipe, substantially as set forth.

3. A boring and excavating implement, comprising an outer tube or hollow shank through which the loosened earth is discharged upwardly, an auger composed of a central tube having one or more steam-outlets at or near its lower end and downwardly-tapering spiral blades arranged around said tube, a coupling-collar connecting the upper ends of said spiral blades with the lower end of said hollow shank and projecting laterally beyond said parts, and a steam-supply pipe extending through said shank and connected at its lower end with the central tube of the auger, substantially as set forth.

Witness my hand this 16th day of June, 1898.

JOHN BERTRAM.

Witnesses:
  THOMAS HICKEY,
  FRANK CRONIN.